B. J. CLOES.
GRAPE PICKING IMPLEMENT.
APPLICATION FILED JUNE 10, 1912.
1,061,661. Patented May 13, 1913.
2 SHEETS—SHEET 1.
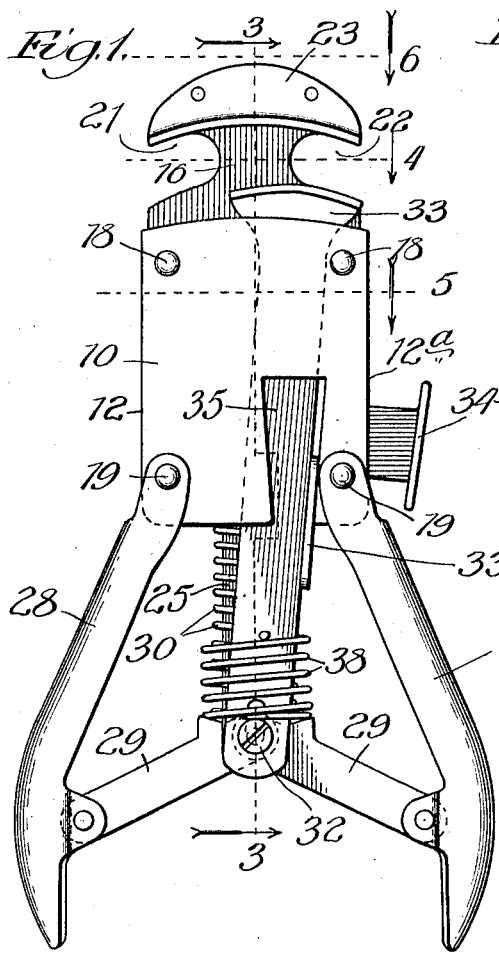
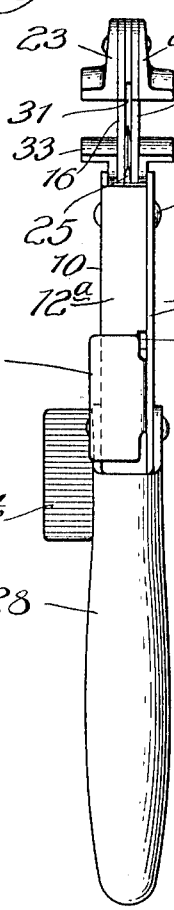
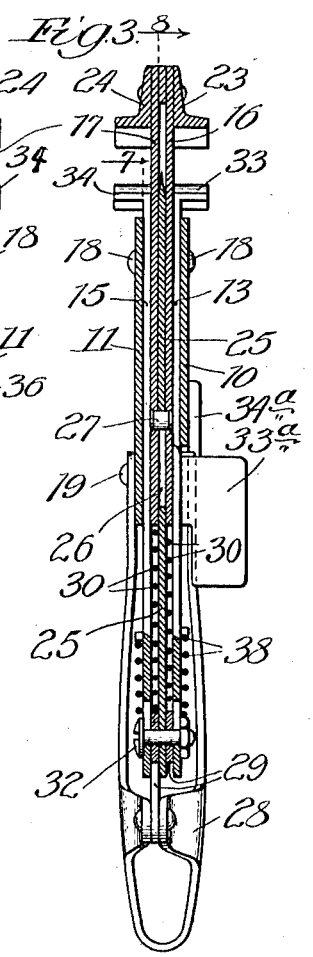
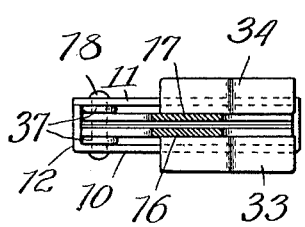
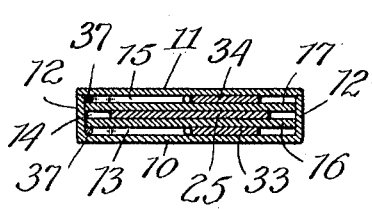
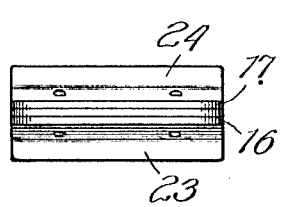
Witnesses:
Inventor:
Benjamin J. Cloes,

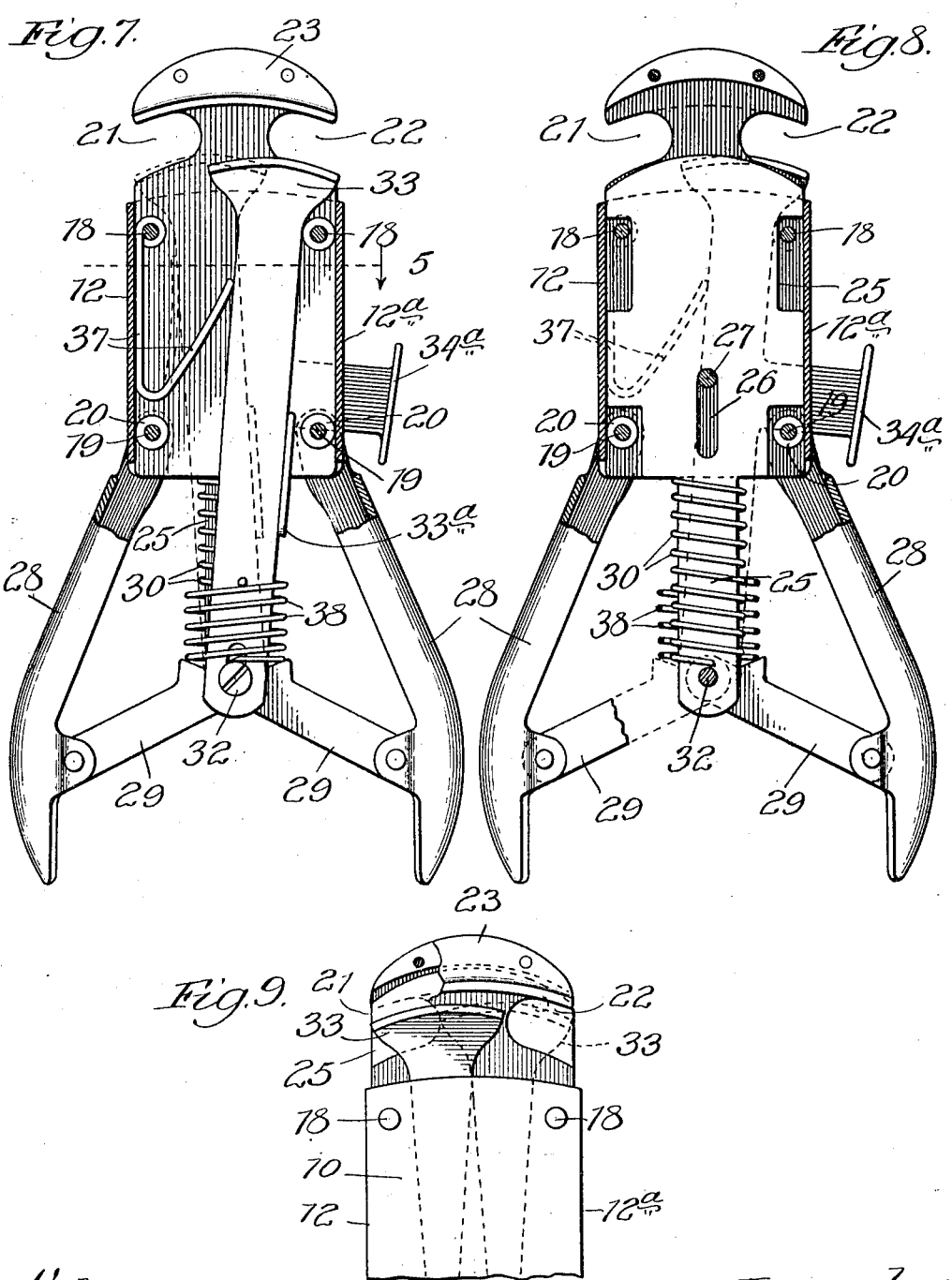

UNITED STATES PATENT OFFICE.

BENJAMIN J. CLOES, OF LOS ANGELES, CALIFORNIA.

GRAPE-PICKING IMPLEMENT.

1,061,661.  Specification of Letters Patent.  Patented May 13, 1913.

Application filed June 10, 1912. Serial No. 702,708.

*To all whom it may concern:*

Be it known that I, BENJAMIN J. CLOES, a citizen of the United States, residing at Los Angeles, in the county of Los Angeles and State of California, have invented a new and useful Improvement in Grape-Picking Implements, of which the following is a specification.

My object is to provide a hand implement, of simple and improved construction, adapting it for convenient use, more especially, in gathering bunches of grapes from vines.

In the accompanying drawings—Figure 1 is a face view of my improved implement with the moving parts in normal position; Fig. 2, a side, or edge, elevation thereof; Fig. 3, a section taken on line 3 in Fig. 1; Figs. 4 and 5, sections taken respectively on lines 4 and 5 in Fig. 1; Fig. 6, an end view of the implement taken from line 6 in Fig. 1; Figs. 7 and 8, sections taken respectively on lines 7 and 8 in Fig. 3; and Fig. 9, a broken and partly sectional view of the end portion of the implement showing the parts at the end of a clipping stroke.

The body of the implement consists of a frame or casing, open at both ends, formed of outer side-plates 10 and 11, the plate 10 being flanged to form the edge-plates 12, $12^a$. The casing is divided into three longitudinally extending compartments 13, 14, 15, by means of two partition-plates 16, 17, the casing and partition-plates being held in rigid spaced relation by rivets 18 and 19, carrying suitably disposed spacing washers 20. The partition-plates 16 and 17 extend beyond the casing where they are cut away on opposite sides to form corresponding grape-stem receiving recesses, or openings 21, 22.

Riveted against the outer faces of the plates 16, 17, at the outer sides of the openings 21, 22, are segmental flanged pieces 23, 24, forming stem-gripping members. In the space 14 is a longitudinally reciprocating cutter-blade, or shearing-member, 25, having a central slot 26 between its ends which receives a guide-stud 27 fastened to the plates 16, 17. Pivoted to the rivets 19 are handles 28 connected through toggle-links 29 with the end portion of the cutter-blade 25. Surrounding the cutter-blade and confined between the inner end of the casing and toggle-links 29 is a spring 30, which tends to hold the cutter-blade in the retracted position shown and the handles 28 extended.

Pressure of the handles toward each other causes the cutter-blade, or shearing-member, 25 to be moved at its cutting edges across the openings 21, 22, into the space between the parts 23, 24, which operate to form a stationary shearing-member 31 into which the cutting edge of the cutter-blade moves.

Pivoted upon the bolt 32 which joins the toggle-links to the cutter-blade are shiftable and longitudinally yielding stem-gripping members 33, 34, consisting of metal strips extending through the casing and having flanged and curved gripping-heads, as shown. The gripping-member 33 carries a projecting thumb-piece $33^a$ extending outward through an opening 35 in the plate 10 and the gripping-member 34 carries a projecting thumb-piece $34^a$ extending outward through an opening 36 in the edge $12^a$. The gripping-members 33, 34, slide longitudinally, in the spaces 13, 15, with the cutter-blade 25 and are held normally pressed in the direction of the edge $12^a$ by the wire springs 37 in the spaces 13, 15.

The implement is adapted to be held in one hand and to cut either to the right or to the left and grip and hold the stems of bunches of grapes extending in any direction. One of the purposes of the implement is to enable the operator to clip bunches of grapes from a vine and perform the gathering operation altogether with one hand without making it necessary to touch the grapes themselves with either hand. In operation, presuming that the implement is held in the right hand: To pick a bunch of grapes extending in the forward direction to the right, the operator will first press his thumb upon the thumb-piece $34^a$, to move the gripping-member 34 out of the way, then pass the implement at the opening 22 over the stem of the bunch and then squeeze the handles 28, causing the shearing-members 25, 31, to sever the stem and the gripping-member 33 to clamp the severed portion of the stem against the gripping-member 23, whereby the bunch is held until deposited in a basket or the like which the operator may carry in his left hand.

If the bunch to be picked extends in the direction away from the operator, he would press upon the thumb-piece $33^a$, to move the gripping-member 33 out of the way, and grip the bunch as it is severed from the vine with the gripping-members 34, 24. In gathering a bunch to the left and extending in the forward direction, the operator would press upon the thumb-piece 33ᵃ, then squeeze the handles 28, so that when the grape-stem is severed, it will be clamped by the gripping-members 33, 23; and if the bunch extends in the opposite direction, he would press upon the thumb-piece 34ᵃ in the picking operation to cause the gripping-members 34, 24, to grasp the stem of the severed bunch. The gripping members 33, 34 may yield slightly against the resistance of a stiff spring 38.

Constructed as described, my improved implement may be employed to pick bunches of grapes quickly with one hand and without the necessity of contact of the operator's hand with the grapes themselves.

While my improved implement is especially adapted for picking grapes it is not to be limited to that particular use.

The foregoing description is intended to convey a clear understanding of my improvements in what I now believe to be the best form of their embodiment, and no undue limitation should be understood therefrom. It is my intention to claim all that is novel in my invention, and that the claims shall be construed as boardly as the prior state of the art may warrant.

What I claim as new and desire to secure by Letters Patent, is—

1. In an implement of the character described, the combination with a frame or casing, of a pair of shearing-members cutting at either side thereof, stem-grippers at opposite sides of the shearing-members, and a pair of handles with which said shearing-members and stem-grippers are operatively connected.

2. In an implement of the character described, the combination with a frame or casing, of a pair of shearing-members cutting at either side thereof, stem-grippers at opposite sides of the shearing-members, each shiftable to operate at either side of said frame or casing, and a pair of handles with which said shearing-members and stem-grippers are operatively connected.

3. In an implement of the character described, the combination of a pair of plates separated from each other, a stem-engaging recess in one side of the plates near the outer end thereof, a stationary stem-gripping member at the outer side of said recess, a movable shearing-blade mounted between said plates to cut across said recess, a movable gripping-member at the side of said blade coöperating with said stationary gripping-member to clamp a stem as it is cut by the shearing-blade, and handles with which said shearing-blade and movable gripping-member are operatively connected.

4. In an implement of the character described, the combination of a pair of plates separated from each other, stem-engaging recesses in opposite sides of the plates near the outer end thereof, stationary stem-gripping members at the outer sides of the recesses, a movable shearing-blade mounted between said plates to cut across said recesses, movable gripping-members at opposite sides of said shearing-blade, each shiftable to either of said recesses and coöperating with said stationary gripping-members to clamp a stem as it is cut by the shearing-blade, and handles with which said shearing-blade and movable gripping-members are operatively connected.

BENJAMIN J. CLOES.

In the presence of—
HILDA A. OPP,
MARY G. LUKASKA.

---

Copies of this patent may be obtained for five cents each, by addressing the "Commissioner of Patents. Washington, D. C."